United States Patent [19]

Danner et al.

[11] Patent Number: 4,743,660

[45] Date of Patent: May 10, 1988

[54] WATER-DISPERSIBLE QUATERNIZED AMINOAMIDE-MODIFIED WAXES USEFUL AS TEXTILE FINISHING AGENTS

[75] Inventors: Bernard Danner, Riedisheim, France; Eckart Schleusener, Reinach, Switzerland

[73] Assignee: Sandoz Ltd., Basel, Switzerland

[21] Appl. No.: 884,164

[22] Filed: Jul. 10, 1986

[30] Foreign Application Priority Data

Jul. 13, 1985 [DE] Fed. Rep. of Germany ....... 3525116

[51] Int. Cl.$^4$ .......................... C03C 19/22; B05D 3/02
[52] U.S. Cl. .................................. 525/382; 427/389.9; 525/379
[58] Field of Search ............... 525/430, 379, 382, 581; 427/389.9; 526/307; 252/8.8

[56] References Cited

U.S. PATENT DOCUMENTS

| | | | |
|---|---|---|---|
| 3,632,559 | 1/1972 | Matter et al. | 525/430 |
| 3,867,187 | 2/1975 | Borenstein | 428/375 |
| 3,950,593 | 4/1976 | Bomball et al. | 427/207 |
| 4,434,196 | 2/1984 | Robinson et al. | 427/389.9 |

*Primary Examiner*—Thurman K. Page
*Attorney, Agent, or Firm*—Gerald D. Sharkin; Richard E. Vila; Thomas C. Doyle

[57] ABSTRACT

A quaternized aminoamide-modified wax obtainable by amidating, with a polyamine containing a single primary amino group, a carboxy group-containing, oxidized hydrocarbon wax which may be partially saponified, and quaternizing at least one amino group of the resulting aminoamide-modified wax, optionally in admixture with a non-oxidized paraffin wax may be applied, preferably in the form of an aqueous dispersion containing a dispersing agent, to a fibrous substrate to improve its workability in mechanical processes.

32 Claims, No Drawings

WATER-DISPERSIBLE QUATERNIZED AMINOAMIDE-MODIFIED WAXES USEFUL AS TEXTILE FINISHING AGENTS

This invention relates to modified dispersible waxes useful as finishing agents for improving the workability of a fibrous substrate in mechanical processes.

The invention provides a quaternized aminoamide-modified wax obtainable by amidating, with a polyamine containing a single primary amino group, a carboxy group-containing, oxidized hydrocarbon wax which may be partially saponified, and quaternizing at least one amino group of the resulting aminoamide-modified wax.

Suitable oxidized hydrocarbon waxes which are modified according to the invention include synthetic and mineral waxes which in the oxidized state still exhibit the properties of a wax, e.g. oxidized lignite wax, oxidized microcrystalline wax, oxidized polyolefin wax, particularly oxidized polyethylene wax, and oxidized Fischer-Tropsch wax. Such oxidized waxes contain carboxy acid groups and optionally carboxy acid ester groups which may be partially saponified. Oxidized Fischer-Tropsch waxes include also those obtained by oxidative synthesis. Preferred oxidized waxes are oxidized microcrystalline waxes, oxidized Fischer-Tropsch waxes, oxidized polyethylene waxes and such waxes which have in addition been partially saponified. Oxidized polyethylene waxes and partially saponified, oxidized polyethylene waxes are particularly preferred.

Waxes of the type mentioned above and used as starting material are known and are generally characterised by the drop point, hardness (as measured by the penetration value according to standard methods such as ASTM-D-1321), saponification number and acid number. They have preferably a drop point of at least 80° C., and advantageously of at most 140° C., more preferably within 85°-130° C.; a hardness or penetration value according to ASTM D-1321≦20, preferably of 1 to 10; a saponification value of from 10 to 120, preferably 20 to 80; and an acid number of from 5 to 80, preferably 10 to 60. The specific gravity is generally of from 0.9 to 1.05 and the molecular weight may be between 500 and 20,000, preferably 500 to 5000, more preferably 1000 and 5000.

The polyamine containing a single primary amino group, used for amidating the oxidized wax, may further contain one or more secondary or tertiary groups or both types. Preferred polyamines are aliphatic or aromatic diamines or a mixture of such, more preferably a diamine of formula I

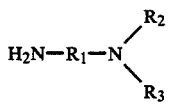

in which
$R_1$ is a divalent $C_{2-8}$ hydrocarbon residue,
$R_2$ is hydrogen, $C_{1-24}$ alkyl, $C_{14-24}$ alkenyl or $C_{2-4}$ hydroxyalkyl, and
$R_3$ is hydrogen, $C_{1-4}$ alkyl, $C_{2-4}$ hydroxyalkyl or benzyl or
$R_2$ and $R_3$, together with the nitrogen to which they are attached, form a morpholino group,
provided that at most one of $R_2$ and $R_3$ is hydrogen.

The divalent hydrocarbon residue as $R_1$ may be aromatic or aliphatic. Examples of suitable significances for $R_1$ are 1,4- or 1,3-phenylene, hexamethylene, tetramethylene, isobutylene, 1,3-propylene or ethylene. $R_1$ is preferably 1,3-propylene or ethylene, particularly 1,3-propylene.

When $R_2$ is $C_{1-24}$ alkyl, it may be an alkyl radical from a higher saturated fatty amine, e.g. behenyl, arachidyl, stearyl, palmityl, myristyl, lauryl or nonyl. When $R_2$ is $C_{14-24}$ alkenyl, it may be an alkenyl radical derived from an unsaturated fatty amine, e.g. oleyl or palmitoleyl.

Any hydroxy-alkyl as $R_2$ or $R_3$ is preferably 2-hydroxy-propyl or 2-hydroxyethyl.

Each of $R_2$ and $R_3$, independently, is preferably a lower alkyl, more preferably $C_{1-4}$alkyl, particularly ethyl or methyl.

Further preferred amines of formula I are diamines of formula Ia

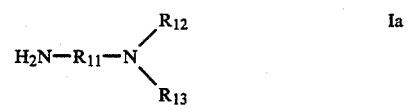

in which
$R_{11}$ is ethylene or 1,3-propylene, and
each of $R_{12}$ and $R_{13}$, independently, is methyl or ethyl.
$R_{11}$ is preferably 1,3-propylene.

Polyamines of formula I are known or may be obtained from known starting materials by known methods. When $R_1$ is 1,3-propylene, a preferred method is adding acrylonitrile to an amine of formula $HNR_2R_3$ and reducing the nitrile into an aminomethyl group.

The amidation of the carboxy group-containing waxes with a polyamine, particularly a diamine of formula I, may be carried out according to known methods. The amidation may be effected conveniently in the melt with splitting off water, preferably at a temperature within the range of 130°-190° C. It is advantageous to carry out the reaction to the extent that the original acid number of the starting wax is reduced by at least 50%. Preferably the modified wax has an acid number which is at most 20% of the acid number of the oxidized wax used as starting material.

According to the invention, the resulting amidated wax is then quaternized. Quaternization may be carried out in accordance with known methods using a conventional quaternizing agent. The reaction is advantageously carried out in the melt, preferably at a temperature within the range of 80°-140° C. Preferred quaternizing agents are those donating a lower molecular radical, particularly benzyl, β-hydroxyethyl, $C_{1-4}$alkyl or carboxymethyl.

According to the invention, at least one amino group of the amino-amide groups introduced in the oxidized wax is quaternized. The quaternization rate may vary depending on the amount of quaternizing agent used. Advantageously the quaternization is carried out to the extent that a major part of the introduced amino-amide groups is quaternized. More preferably the amino-amide groups present in the molecule are substantially all quaternized.

The waxes of the invention are waxes modified by quaternary residues which, when derived from amines of formula I, may conform to formula II

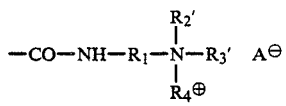

in which

R$_4$ is C$_{1-4}$ alkyl, β-hydroxyethyl, benzyl or carboxymethyl,

A$^\ominus$ is a colourless anion, and each of R$_2'$ and R$_3'$, independently, has one of the significances given for R$_2$ and R$_3$, respectively, except the significance of hydrogen, or one of R$_2'$ and R$_3'$ has one of the significances given for R$_4$ when in the amine of formula I one of R$_2$ and R$_3$ is hydrogen.

When R$_4$ is carboxymethyl, depending on the pH, the corresponding quaternary residue of formula II may exist in the form of an internal salt, i.e. the carboxy group may be in the anion form and correspond to the negative ion A$^\ominus$ of the formula.

R$_4$ is preferably ethyl, methyl or carboxymethyl, particularly methyl.

The residue of formula II preferably bears at most one carboxymethyl group. A$^\ominus$ is preferably an anion selected from the group consisting of halides (bromide or chloride), ethylsulphate and methylsulphate, ethylsulphate and methylsulphate being particularly preferred.

Preferably the modified waxes of the invention bear residues of formula IIa

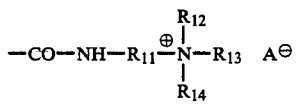

in which

R$_{11}$, R$_{12}$ and R$_{13}$ are as defined above, and

R$_{14}$ is methyl, ethyl or carboxymethyl.

The modified waxes of the invention may be in the form of a single quaternized wax or a mixture of quaternized waxes, e.g. a mixture of quaternized oxidized polyethylene waxes, Fischer-Tropsch waxes or microcrystalline waxes or a mixture of 2 or 3 of these types of quaternized waxes.

The quaternized aminoamide-modified waxes of the invention—referred herein as (a$_1$)—are useful finishing agents. For their use, they may be mixed with (a$_2$) a non-oxidized paraffin wax. Suitable paraffin waxes (a$_2$) are those having a drop point of at least 30° C., preferably from 45° to 110° C. They are preferably a penetration value according to ASTM-D 1321 < 60. Such non-oxidized paraffin waxes are macrocrystalline waxes. For 1 part by weight of wax (a$_1$) it may be advantageous to add up to 2 parts by weight, preferably from 0.2 to 1.2 parts by weight, of wax (a$_2$).

In the following disclosure, for the sake of simplicity, the expression "wax (a)" refers to the total wax present, i.e. the quaternized aminoamide-modified wax (a$_1$) [a single wax (a$_1$) or a mixture of waxes (a$_1$)] optionally in admixture with a non-oxidized paraffin wax (a$_2$).

The wax (a) is conveniently used in combination with one or more dispersing agents (b) in the form of an aqueous dispersion. Such an aqueous dispersion also forms part of the invention. Any unoxidized paraffin wax (a$_2$) which may be present as an optional component is also dispersed in the aqueous medium.

The term "dispersion" herein includes both suspensions of solid particles (i.e. below the melting point of the wax component) and emulsions of liquid droplets in water (i.e. above the melting point of the wax components).

The dispersing agent (b) may be any conventional dispersing agent, advantageously a non-ionic, cationic or amphoteric surfactant.

Suitable non-ionic surfactants include the addition products of ethylene oxide to higher fatty acids, acid amides and alcohols and mono- or dialkyl phenols, and a polyhydric alcohol higher fatty acid mono- or diester and the corresponding ethylene oxide addition products, e.g. sorbitan fatty acid mono- or diester. Examples of such non-ionic surfactants are particularly those having a HLB-value within the range of 2 to 12.

Any cationic surfactant usually employed as dispersing agent may be used, for example those disclosed in DE-OS 30 03 851.

Suitable amphoteric surfactants include those of the betaine type and amino carboxylic acid derivatives and their ethylene oxide addition products (including those having a polyethylene glycol chain incorporated in the molecule).

The dispersing agent (b) is preferably an amphoteric or cationic surfactant, the latter being particularly preferred, or a mixture thereof.

According to a preferred embodiment of the invention, the surfactant (b) is an aminoamide, preferably a quaternized aminoamide, particularly such exhibiting a structure analogous to that of the quaternary residues of the wax (a$_1$). Preferred aminoamide surfactants (b) are quaternized cationic or amphoteric compounds of formula III

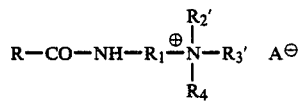

in which

R$_1$, R$_2'$, R$_3'$, R$_4$ and A$^\ominus$ are as defined above and

RCO— is the acyl residue of an aliphatic C$_{8-24}$ fatty acid.

The residue RCO— is preferably the acyl radical of a saturated or monoethylenically unsaturated C$_{8-24}$ fatty acid, more preferably C$_{16-22}$ fatty acid, particularly of the palmitic, stearic, oleic or behenic acid or of a technical fatty acid mixture, e.g. tallow fatty acid.

Preferred surfactants of formula (III) are those of formula (IIIa)

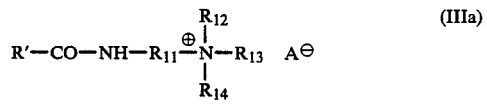

in which

R$_{11}$ to R$_{14}$ and A$^\ominus$ are as defined above and

R'CO— is the acyl radical of an aliphatic, saturated or monoethylenically unsaturated C$_{16-22}$ fatty acid.

In the formula (III) or (IIIa) RCO— or R'CO—, respectively, is preferably C$_{16-22}$ alkyl carbonyl or C$_{16-22}$ alkenylcarbonyl, particularly stearoyl.

The surfactants of formula III may be prepared according to known methods, by amidating an appropriate fatty acid R—COOH or a functional derivative of such an acid, e.g. an acid halide or anhydride with an amine of formula I, preferably an amine of formula Ia, and quaternizing the resulting amide.

The amidation and quaternization may be carried out e.g. as disclosed above. The quaternization may also be effected in an inert solvent at a temperature from room temperature to the boil, preferably at 30°–70° C.

According to a further preferred embodiment of the invention, the non-quaternized amino-amide modified wax is mixed with the non-quaternized aminoamide surfactant (b) and the mixture is quaternized together, preferably with a $R_4$- or $R_{14}$-donating quaternizing agent. When such a mixture is quaternized, the reaction is advantageously carried out under quaternization conditions such as disclosed above for the quaternization of the aminoamide-modified wax.

The dispersing agent (b) is used in sufficient quantity to ensure complete dispersion of the wax (a) in the aqueous phase, in order to obtain a stable dispersion at a suitably high concentration.

The weight ratio of dispersing agent (b) to the wax (a) is conveniently 0.1–1:1, preferably 0.15–0.6:1, more preferably 0.2–0.4:1.

The aqueous dispersions of the invention may be prepared in conventional manner, preferably by melting the wax ($a_1$) and optionally ($a_2$) and surfactant (b) together and adding warm water to the melt or pouring the melt into warm water with simultaneous or subsequent stirring or shaking, until the desired degree of dispersion is obtained, then cooling the mixture. When the wax and the aminoamide surfactant are quaternized simultaneously, as stated above, the resulting melt is, optionally after addition of the wax ($a_2$), either diluted with warm water or poured into warm water with simultaneous or subsequent stirring or shaking as already mentioned above. The resulting aqueous dispersions are substantially finely dispersed compositions. In the concentrated form, the aqueous dispersions of the invention preferably have a dry weight content of from 15 to 50% by weight. Before use, such concentrated aqueous dispersions may be further diluted with water. The dispersion may optionally contain conventional additives, for example anti-freezing agents and fungicides.

The wax ($a_1$), optionally in admixture with a wax ($a_2$), and the aqueous dispersions are useful in any field where dispersible or emulsifiable waxes are used, e.g. in polishes and coatings. They are particularly useful finishing agents for improving the workability of a fibrous material, preferably a textile fibrous material, in mechanical processes, especially, dry mechanical processes, e.g. sewing and raising of flat form textiles or tubular textiles and the workability of yarns (winding, re-spooling, weaving, knitting etc.).

Accordingly, the present invention also provides a process for the treatment of a fibrous substrate comprising applying to the substrate, as finishing agent, a wax ($a_1$) or a mixture of wax ($a_1$) and ($a_2$) as defined above. Preferably the wax is applied in the form of an aqueous dispersion containing one or more dispersing agents (b) as stated above.

Suitable textile substrates for treatment by the process of the invention include those containing natural, synthetic or semi-synthetic fibres, or mixtures thereof, particularly those containing natural or regenerated cellulose, natural or synthetic polyamide, polyester, polyurethane or polyacrylonitrile fibres, or mixtures thereof. The material can be in any conventional form, for example as fibres, filaments, threads, yarns, bobbins, woven or knitted goods, fleeces, non-woven, felts, carpets, velvets, tufted goods, semi-finished goods or artificial leather. Preferably the substrate is in the form of cones, fabrics or tubular goods, particularly tubular knitted goods.

The treatment process is advantageously carried out from an aqueous, slightly acidic to slightly alkaline medium, preferably at a pH between 4 and 9, more preferably under pH-conditions from approximately neutral to slightly acidic, especially at a pH from 5 to 7.5.

The temperature of application is such as is compatible with the substrate and chemicals used, preferably between room temperature and 60° C., more preferably between 25° and 50° C.

The wax dispersion according to the invention has good substantivity and is suitable for application both by impregnation and by exhaust methods. The process of the invention thus includes application by conventional impregnation methods such as dipping, padding or spray processes, and also by conventional exhaust processes using long or short liquor ratios, e.g. liquor-to-goods ratios of from 100:1 to 0.5:1, particularly from 60:1 to 2:1.

Although the treated goods may be rinsed once before drying, it is preferred to dry directly without rinsing. Drying may be carried out at room temperature, but preferably by warming. Advantageously, drying is carried out at a temperature from 30° to 180° C., preferably from 60° to 140° C. The total concentration of the finishing agent on the substrate can be varied within wide limits according to the nature of the substrate and the desired effect. Preferably however, the total concentration [wax (a)+dispersing agent (b)] lies between 0.25% and 2%, more preferably 0.5% to 1.5% of dry substance, based on the dry weight of the substrate.

The treatment according to the invention is preferably carried out as the last finishing step before the mechanical working up of the substrate. It is convenient to carry out the treatment in the same apparatus at that used for an earlier finishing process, e.g. dyeing or optical brightening, optionally after an additional treatment, for example a permanent finishing. Thus a textile material may for example be dyed by the exhaust process and the dispersion according to the present invention be added to the last rinse water, or a fabric may be finished by a padding operation, in which the last step is padding with the dispersion of the invention.

The process of the invention significantly reduces machine damage, particularly damage by sewing, to the treated textile substrate, so that both fine and thick textile goods, as well as goods with a high content of synthetic fibres, can be sewn on high-speed industrial machines. The speed of operation of the sewing machine can thus be increased without causing excessive heating of the needle and damage to the fibres.

The aqueous dispersions of the invention, particularly those in which the dispersing agent (b) is a compound of formula III, have a high stability even under conditions of high dynamic stress and are therefore particularly suitable for finishing of textile webs and tubular goods in jet dyeing machines or for the finishing in the presence of high shearing forces.

The aqueous dispersions of the invention are also suitable for the wet paraffin coating of cones and cheese; in such a treatment, the bath is subjected to a high dynamic stress caused by the forced passage through the wound yarns from inside to outside. The dispersions of the invention are stable enough to withstand these stress conditions, allowing the substrate to be evenly finished.

The wax finish on the substrate which is produced by the process of the invention is a non permanent finish. It has a softening effect and improves the handle of the goods. It may be left on the finished goods, or, if desired, may be removed after the mechanical operations have been completed.

The following Examples, in which all parts and percentages are by weight, illustrate the invention. The temperature is given in degree Celsius. 1° dH=1 deutscher Härtegrad (German degree of hardness)

EXAMPLES

Starting materials

Dispersing agents

D1  $C_{17}H_{35}CONH(CH_2)_3-\overset{\oplus}{\underset{CH_3}{N}}-CH_3, CH_3OSO_3^{\ominus}$ $CH_3$ D2  $C_{17}H_{33}CONH(CH_2)_3-\overset{\oplus}{\underset{CH_3}{N}}-CH_3, CH_3OSO_3^{\ominus}$ $CH_3$ D3  $C_{21}H_{43}CONH(CH_2)_3-\overset{\oplus}{\underset{CH_3}{N}}-CH_3, CH_3OSO_3^{\ominus}$ $CH_3$ D4  $C_{17}H_{35}CONH(CH_2)_3-\overset{\oplus}{\underset{CH_3}{N}}-CH_2COONa, Cl^{\ominus}$ $CH_3$ Non oxidized paraffin waxes P

| | Solidification range | Drop point | Hardness (ASTM D-1321) |
|---|---|---|---|
| P1 | 54–56° | 56° | 20 |
| P2 | 78–82° | 80–90° | 7–11 |
| P3 | 88–93° | 98–102° | 4–6 |
| P4 | 94–98° | 105–108° | 1–3 |
| P5 | | 58–60° | 20 |

Oxidized waxes W

| | |
|---|---|
| W1 | oxidized polyethylene (PED 522, Hoechst, Federal Republic of Germany) |
| | Specific gravity (20°/4°)  0.94 |
| | Drop range  95–100° |
| | Solidification range  83–88° |
| | Hardness (ASTM D-1321)  6–8 |
| | Acid number  25 |
| | Saponification number  45 |
| W2 | oxidized microcrystalline wax (Petrolite C 7500, Petrolite Corp., Bareco Division, USA) |
| | Drop point  100° |
| | Hardness (ASTM D-1321)  3 |
| | Acid number  15 |
| | Saponification number  31 |
| W3 | oxidized Fischer-Tropsch wax (Vestowax J 324 ST, Chemische Werke Huls, Federal Republic of Germany) |
| | Drop point  105–115° |
| | Hardness (ASTM D-1321)  1–2 |
| | Acid number  10–14 |
| | Saponification number  20–30 |

Preparation of the cationic wax $K_1$ 2240 parts oxidized polyethylene wax W 1 are melted at 110° and then 112 parts 3-(dimethylamino)-propylamine are added to the melt. The temperature is then raised to 180° in the course of 8 hours under nitrogen and is kept at 180° for 10 hours. After cooling at 150° and reduction of the pressure to 26 mbar, the mixture is stirred under this vacuo for 30 minutes. There is obtained about 28 g of a distillate having a 36% amine content. The condensation product has an acid number of about 3.0. The nitrogen atmosphere is purged and, after cooling, 111 parts dimethyl sulphate are added dropwise at 110° to the mixture. This amount corresponds to that necessary for the quaternization of the amido-amine groups determined by the decrease of the acid number. After 30 minutes reaction at 110°, the resulting quaternized cationic wax $K_1$ is discharged.

Preparation of the cationic wax/paraffin dispersion x Parts non-oxidized paraffin P wax are melted and heated to 110°. y Parts of the cationic wax $K_1$ and z parts dispersing agent D are then added thereto. As soon as the melt is homogeneous, i.e. after about 15 to 30 minutes, 500 parts of water at 90°–95° are added as quickly as possible to the mixture while stirring at a temperature of 103°–104°. There is obtained a fine, milky dispersion which is further stirred for 30 minutes at 95°. Thereafter 250 parts ice are added to the mixture which is then cooled as quickly as possible and discharged at 30°. There are obtained 1000 parts dispersion.

| Examples | P | D | x | y | z |
|---|---|---|---|---|---|
| 1 | $P_1$ | $D_1$ | 100 | 100 | 50 |
| 2 | $P_2$ | $D_1$ | 100 | 100 | 50 |
| 3 | $P_3$ | $D_1$ | 100 | 100 | 50 |
| 4 | $P_4$ | $D_1$ | 100 | 100 | 50 |
| 5 | $P_1$ | $D_2$ | 100 | 100 | 50 |
| 6 | $P_1$ | $D_4$ | 100 | 100 | 50 |
| 7 | $P_1$ | $D_1$ and $D_3$ | 80 | 80 | 40 / 50 $D_3$ |
| 8 | $P_5$ | $D_1$ | 100 | 100 | 50 |

EXAMPLE 9

(a) 2240 Parts oxidized polyethylene wax W 1 are reacted with 112 parts 3-(dimethylamino)-propylamine as disclosed above. Before the resulting amido-amine is quaternized, it is discharged on a metal plate. (b) Condensation of stearic acid with 3-(dimethylamino)-propylamine. 270 parts stearic acid (technical grade) having an acid number of 208 are melted at 90° and 112 parts of 3-(dimethylamino)-propylamine are added thereto under a nitrogen atmosphere. Thereafter the temperature is kept at 130° for 2 hours and then raised to 175° at a heating rate of 10° per hour. After stirring for 5 hours, the pressure is reduced for 1 hour. About 18 parts water and 10 parts 3-(dimethylamino)-propylamine in excess are distilled off. The warm residue is discharged on a plate for cooling.

(c) Quaternization and preparation of the dispersion. 95.4 parts of the wax condensation product obtained in 9(a) and 37.3 parts of the N-(dimethylaminopropyl)-stearic acid amide of Example 9(b) are melted at 110° under a nitrogen atmosphere. 17.3 Parts dimethylsulphate are then added in the course of 15 minutes and the mixture is stirred for 30 minutes at 105°–115°. Thereafter 100 parts of paraffin wax P$_5$ are added in the course of 20 minutes and the resulting mixture is thoroughly mixed. 500 Parts demineralized water at 90°–92° are then added quickly to the melt at 110°.

After 30 minutes there is obtained a fine dispersion which is rapidly cooled in an ice-bath after addition of 250 parts ice and then discharged.

The dispersion may also be prepared by pouring the wax/paraffin melt obtained above in the corresponding amount of water at 90°–95°.

EXAMPLE 10

(a) 2000 Parts oxidized microcrystalline wax W 2 are melted at 110° and then 71 parts 3-(dimethylamino)-propylamine are added to the melt. The temperature is raised to 130° in the course of 1 hour and kept at 130° for 3 hours. The mixture is then heated to 180° for 5 hours and the condensation is carried out at 180° for 12 hours. After cooling to 150°, the pressure is reduced to 25 mbar and the mixture is stirred under this vacuo for 30 minutes. About 23 parts distillate are obtained. The condensation product has an acid number of 2.8. The nitrogen is purged and the product is discharged.

(b) 48.1 Parts of the condensation product obtained in Example 10(a) above, 47.8 parts of the condensation product obtained in Example 9(a) and 37.1 parts of the N-dimethylaminopropyl stearic acid amide obtained in Example 9(b) are melted together at 110° under a nitrogen atmosphere. 16.9 Parts dimethyl sulphate are added to the melt in the course of 60 minutes and the whole is stirred for 30 minutes at 120°. 100 Parts melted paraffin wax P$_5$ (melted at 85°) are then added to the mixture over a few minutes and the whole is thoroughly mixed. After stirring for 20 minutes at 120°, the hot melt is added to 500 parts water at 95°. After stirring for 30 minutes at 95°–97°, 250 parts water at 15° are added to the resulting dispersion which is then cooled to room temperature and discharged.

EXAMPLE 11

(a) 748 Parts wax W 3 are reacted with 30.6 parts dimethylaminopropylamine according to the procedure disclosed in Example 9(a). There is obtained a product having an acid number of 1 and an amine value of 37.

(b) 96.7 Parts of the condensation product obtained above in Example 11(a) and 37.1 parts of the N-dimethylaminopropyl stearic acid amide obtained in Example 9(b) are melted together at 120° under a nitrogen atmosphere. 16.2 Parts dimethyl sulphate are added to the melt in the course of 1 hour at 100°–115°. After 30 minutes, 100 parts paraffin wax P$_5$ are added to the mixture and the whole is thoroughly mixed. The resulting melt is then poured at 115°–120° over 5 minutes into 500 parts water at 95°–97° and is immediately converted into a white milky dispersion. After 30 minutes, 250 parts water at 15° are added to the dispersion which is then cooled to room temperature with stirring.

EXAMPLE 12

The procedure of Example 11 is repeated except that 20.6 parts dimethyl sulphate are added instead of 16.2 parts.

Application Examples A–C

A 1 kg of cotton Single Jersey (dyed in blue) are treated at 40° with a liquor to goods ratio of 8:1 in a laboratory Jet machine from Mathis (Switzerland) with 40 g of a dispersion obtained in the Examples 1 to 12. The circulation rate of the bath is 60 l per minute. Water having a hardness of 10° dH (according to DIN 53 905) and a pH of 6 is used for the treatment. After a treatment of 20 minutes, the textile substrate is hydroextracted and dried for 90 seconds at 140° in the absence of tension and its sewability is then tested.

During the treatment no deposits or greasy precipitations occur. The textile substrate is spotless and no residues are left in the machine after discharging of the treatment bath.

The dispersions of Examples 1 to 12 are resistant to shearing forces and improve the sewability of the treated cotton substrate.

| B | Machine: | 3-roll jet machine from Avesta (Sweden) |
|---|---|---|
| | Substrate: | 150 kg polyester/cotton (50:50) tricot dyed with reactive and disperse dyes (single bath - two step) and treated with a cationic agent. |
| | Product: | 3.0% (based on the weight of the substrate) of the dispersion of Example 1 |
| | Bath: | 2000 l deionized water |
| | Goods to liquor ratio: | 1:15 |
| | pH: | 5.5 |
| | Temperature: | 30° |
| | Treatment time: | 20 minutes |
| | Speed of the goods: | 80 m/min. |
| | Procedure: | the dispersion, pre-diluted with 150 l water, is metered in the course of 7 minutes to the remaining bath volume. The temperature is kept constant. At the end of the treatment, the bath is substantially exhausted. After discharging of the treatment bath, the resulting tricot is spotless and the machine is free from deposits. After drying, the treated tricot has a substantially improved sewability. |

By following the procedure of Example B but using the dispersions of Examples 2 to 12, good results are obtained.

| C | Machine: | Jet R 95 from Thies, 3 chambers |
|---|---|---|
| | Substrate: | 360 kg polyester/cotton (50:50) Single Jersey, dyed in Bordeaux |
| | Product: | 2.8% (based on the weight of the substrate) of the dispersion of Example 1 |
| | Bath: | 2000 l deionized water |
| | Goods to liquor ratio: | 1:5.5 |
| | pH | 7.0 |
| | Temperature: | 30° |
| | Treatment time: | 20 min. |
| | Speed of the goods: | 370 m/min. |
| | Procedure: | the dispersion, pre-diluted with 150 l water is metered in the course of 15 minutes to the remaining 1850 l. No precipitates, deposits or spots occur. The aspect and the sewability of the dried Jersey are good. |

By following the procedure of Example C but using the dispersions of Examples 2 to 12, good results are obtained.

Sewability test method

Two pieces of the same textile substrate are treated with the same bath and heat treated separately. After 24 hours equilibration at 65% R.H. and 20°, both treated pieces are sewn together but without sewing thread, with a Pfaff type 483 step stitch sewing machine at a speed of 4800 stitches/min. The penetration force is measured by a strain gauge bridge located under the fabric at the point of sewing, and is registered on a UV chart recorder. The penetration force is read off the recorder when, after an initial period, the sewing speed (4800 stitches/min) becomes approximately constant. The zero value is read off the recorder when the machine is operating at the same speed but without fabric. An average value of the penetration force is taken for 10 seams each of 100 stitches.

The needles used are of the type SES/80 (small ball point) supplied by F. Schmetz GmbH, 5120 Herzogenrath, Germany and are described in their publication Taschenbuch der Nähtechnik, 1975.

Application Example D 100 kg mercerized cotton yarn in skeins are treated with 2% (based on the weight of the substrate) of the dispersion of Example 9.

| | |
|---|---|
| Machine: | Hugdson, Walker, Davis dyeing machine (spraying) |
| Bath: | 1000 l |
| pH: | 6.0 |
| Treatment: | 20 minutes at 40°. |

After the treatment, the yarn is dried and wound in cones. The yarn is submitted to a fibre-metal friction test and the fibre-metal friction coefficient f is measured using a Rotschild F-meter under the following conditions:

| | |
|---|---|
| winding angle: | 120° |
| preliminary tension: | 15 g |
| winding-off-speed: | 50 m/min. and 100 m/min. |

The yarn treated with the dispersion of Example 9 exhibits a significantly lower f-value than a corresponding untreated yarn.

What is claimed is:

1. A quaternized aminoamide-modified wax obtainable by amidating, with a polyamine containing a single primary amino group, a carboxy group-containing oxidized hydrocarbon wax which are non-saponified or partially saponified, and quaternizing at least one amino group of the resulting aminoamide-modified wax.

2. A quaternized aminoamide-modified wax according to claim 1, in which the oxidized hydrocarbon wax is selected from the group consisting of oxidized Fischer-Tropsch waxes, oxidized microcrystalline waxes and oxidized polyethylene waxes and mixtures of such waxes, which waxes are non-saponified or partially saponified.

3. A quaternized aminoamide-modified wax according to claim 1, in which the aminoamide-modified wax has an acid number which is at most 50% of the original acid number of the carboxy group-containing, oxidized hydrocarbon wax.

4. A quaternized aminoamide-modified wax according to claim 1 in which the polyamine is a compound of formula I

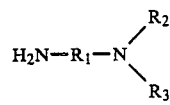

in which $R_1$ is a divalent $C_{2-8}$ hydrocarbon residue, $R_2$ is hydrogen, $C_{1-24}$ alkyl, $C_{14-24}$ alkenyl or $C_{2-4}$ hydroxyalkyl, and $R_3$ is hydrogen, $C_{1-4}$ alkyl, $C_{2-4}$ hydroxyalkyl or benzyl or $R_2$ and $R_3$, together with the nitrogen to which they are attached, form a morpholino group, provided that at most one of $R_2$ and $R_3$ is hydrogen.

5. A quaternized aminoamide-modified wax according to claim 1, in which the aminoamide-modified wax is quaternized with a quaternizing agent donating $C_{1-4}$alkyl, β-hydroxyethyl, benzyl or carboxymethyl.

6. A quaternized aminoamide-modified wax according to claim 1, in admixture with a non-oxidized paraffin wax.

7. A process for the treatment of a fibrous substrate comprising applying to the substrate, as finishing agent, a quaternized aminoamide-modified wax as defined in claim 1.

8. A process according to claim 7, in which the fibrous substrate comprises natural or regenerated cellulose, natural or synthetic polyamide polyester, polyurethane or polyacrylonitrile fibres, or mixtures thereof.

9. A quaternized aminoamide-modified wax according to claim 1 in which the carboxy group-containing oxidized hydrocarbon wax has a drop point of 80° to 140° C., a penetration value according to ASTM D-1321≦20 and an acid number of from 5 to 80.

10. A quaternized aminoamide-modified wax according to claim 2 in which the oxidized hydrocarbon wax has a drop point of 85° to 130° C., a penetration value according to ASTM D1321 of 1 to 10 and an acid number of from 10 to 60.

11. A quaternized aminoamide-modified wax according to claim 3 in which the original acid number of the carboxy group-containing oxidized hydrocarbon wax is in the range from 5 to 80.

12. A quaternized aminoamide-modified wax according to claim 4 in which the carboxy group-containing oxidized hydrocarbon wax has a drop point of 80° to 140° C., a penetration value according to ASTM D-1321≦20 and an acid number of from 5 to 80.

13. A quaternized aminoamide-modified wax according to claim 4 in which the carboxy group-containing oxidized hydrocarbon wax is selected from the group consisting of oxidized Fischer-Tropsch waxes, oxidized microcrystalline waxes and oxidized polyethylene waxes and mixtures of such waxes, which waxes are non-saponified or partially saponified.

14. A quaternized aminoamide-modified wax according to claim 13 in which the carboxy group-containing oxidized hydrocarbon wax has a drop point of 80° to 140° C., a penetration value according to ASTM D-1321≦20 and an acid number of from 5 to 80.

15. A quaternized aminoamide-modified wax according to claim 14 in which the aminoamide-modified wax has an acid which is no more than 50% of the original acid number of the carboxy group-containing oxidized hydrocarbon wax.

16. A quaternized aminoamide-modified wax according to claim 1 in which the amino-amide groups are substantially all quaternized.

17. A quaternized aminoamide-modified wax according to claim 11 in which the aminoamide groups are substantially all quaternized.

18. A process for the treatment of a fibrous substrate comprising applying to the substrate, as finishing agent, a quaternized aminoamide-modified wax according to claim 17.

19. A process for the treatment of a fibrous substrate comprising applying to the substrate, as finishing agent, a quaternized aminoamide-modified wax according to claim 17.

20. A quaternized aminoamide-modified wax according to claim 12 wherein, in the compound of formula I, $R_1$ is 1,4- or 1,3-phenylene, hexamethylene, tetramethylene, isobutylene, 1,3-propylene or ethylene and $R_2$ and $R_3$ are, independently $C_{1-4}$alkyl.

21. A quaternized aminoamide-modified wax according to claim 14 wherein, in the compound of formula I, $R_1$ is 1,4- or 1,3-phenylene, hexamethylene, tetramethylene, isobutylene, 1,3-propylene or ethylene and $R_2$ and $R_3$ are, independently $C_{1-4}$alkyl.

22. A quaternized aminoamide-modified wax according to claim 15 wherein the carboxy group-containing oxidized hydrocarbon was has a drop point of 85° to 130° C., a penetration value according to ASTM D-1321 of 1 to 10, an acid number of from 10 to 60 and a molecular weight between 500 and 20,000 and, in the compound of formula I, $R_1$ is 1,3-propylene or ethylene and $R_2$ and $R_3$ are, independently, methyl or ethyl.

23. A quaternized aminoamide-modified wax according to claim 15 in which the aminoamide-modified wax has an acid number which is at most 20% of the acid number of the starting carboxy group-containing hydrocarbon wax.

24. A quaternized aminoamide-modified wax according to claim 21 in which the aminoamide-modified wax has an acid number which is at most 20% of the acid number of the starting carboxy group-containing hydrocarbon wax.

25. A quaternized aminoamide-modified wax according to claim 23 in which the aminoamide-modified wax has an acid number which is at most 20% of the acid number of the starting carboxy group-containing hydrocarbon wax.

26. A quaternized aminoamide-modified wax according to claim 22 which is quaternized with a quaternizing agent donating a benzyl, β-hydroxyethyl, $C_{1-4}$alkyl or carboxymethyl radical to an extent that a major part of the aminoamide groups are quaternized.

27. A quaternized aminoamide-modified wax according to claim 26 which is quaternized with a quaternizing agent donating a benzyl, β-hydroxyethyl, $C_{1-4}$alkyl or carboxymethyl radical to an extent that substantially all aminoamide groups present in the molecule are quaternized.

28. A quaternized aminoamide-modified wax according to claim 12 in admixture with, per part by weight, 0.2 to 1.2 parts by weight of a non-oxidized paraffin wax.

29. A quaternized aminoamide-modified wax according to claim 23 in admixture with, per part by weight, 0.2 to 1.2 parts by weight of a non-oxidized paraffin wax having a drop point of from 45° to 110° C. and a penetration value according to ASTM D-1321 less than 60.

30. A quaternized aminoamide-modified wax according to claim 28 in admixture with, per part by weight, 0.2 to 1.2 parts by weight of a non-oxidized paraffin wax having a drop point of from 45° to 110° C. and a penetration value according to ASTM D-1321 less than 60.

31. A quaternized aminoamide-modified wax according to claim 23 wherein the carboxy group-containing oxidized hydrocarbon wax is oxidized polyethylene wax.

32. A quaternized aminoamide-modified wax according to claim 26 obtained by amidating an oxidized polyethylene wax having a drop point of 95° to 1000° C., a penetration value according to ASTM D-1321 of 6–8 and an acid number of 25 with 3-(dimethylamino)-propylamine and quaternizing the resulting product with dimethyl sulphate.

* * * * *

UNITED STATES PATENT AND TRADEMARK OFFICE
CERTIFICATE OF CORRECTION

PATENT NO. : 4,743,660

DATED : May 10, 1988

INVENTOR(S) : Bernard Danner and Eckart Schleusener

It is certified that error appears in the above-identified patent and that said Letters Patent is hereby corrected as shown below:

Claim 1, fourth line; change "are" to -- is --.

Claim 8, third line; insert a comma after "polyamide".

Claim 15, third line; insert -- number -- after "acid".

Delete claim 19.

Claim 24, second line; change "21" to -- 20 --.

Claim 25, second line; change "23" to -- 22 --.

Claim 26, second line; change "22" to -- 21 --.

Claim 27, second line; change "26" to -- 25 --.

Claim 29, second line; change "23" to -- 22 --.

Claim 30, second line; change "28" to -- 27 --.

Claim 31, second line; change "23" to -- 22 --.

UNITED STATES PATENT AND TRADEMARK OFFICE
CERTIFICATE OF CORRECTION

PATENT NO. : 4,743,660

DATED : May 10, 1988

INVENTOR(S) : Bernard Danner and Eckart Schleusener

It is certified that error appears in the above-identified patent and that said Letters Patent is hereby corrected as shown below:

Claim 32, second line; change "26" to -- 25 --.

Claim 32, third line; change "1000" to -- 100 --.

Signed and Sealed this

Twenty-fourth Day of January, 1989

*Attest:*

DONALD J. QUIGG

*Attesting Officer*     *Commissioner of Patents and Trademarks*